United States Patent

[11] 3,623,610

| [72] | Inventors | Ole Jentoft Olsen;<br>Rud Frik Madsen, both of Nakskov,<br>Denmark |
|---|---|---|
| [21] | Appl. No. | 868,860 |
| [22] | Filed | Oct. 23, 1969 |
| [45] | Patented | Nov. 30, 1971 |
| [73] | Assignee | Aktieselskabet De Danske Sukkerfabrikker<br>Copenhagen, Denmark |
| [32] | Priority | Oct. 25, 1968 |
| [33] | | Denmark |
| [31] | | 5179/68 |

[54] REVERSE OSMOSIS APPARATUS
7 Claims, 11 Drawing Figs.

[52] U.S. Cl. .................................................. 210/321,
210/336, 210/346, 210/433
[51] Int. Cl. ...................................................... B01d 31/00,
B01d 13/00
[50] Field of Search .......................................... 210/23,
321, 336, 347, 433, 346

[56] References Cited
UNITED STATES PATENTS
| 3,397,785 | 8/1968 | Jarvis et al. | ............... | 210/321 X |
| 3,398,834 | 8/1968 | Nuttall et al. | ............... | 210/321 |

Primary Examiner—Frank A. Spear, Jr.
Attorney—Watson, Cole, Grindle & Watson

ABSTRACT: In an apparatus for reversed osmosis comprising a plurality of disc-formed semipermeable membranes arranged in a pile the liquid to be treated is conducted alternatively outwardly and inwardly along the membranes. Between the membranes combined distance rings and guide plates are arranged which respectively separate the membranes and conduct the liquid along the membranes. In each combined distance ring and guide plate holes are provided inside the distance ring for conducting the liquid from one side of the guide plate to the other and at the center of the pile the liquid is transferred from one membrane to the next membrane through gaps between the membranes and a central bolt which clamps the pile together axially

PATENTED NOV 30 1971 3,623,610

INVENTOR

BY

ATTORNEY

REVERSE OSMOSIS APPARATUS

BACKGROUND OF THE INVENTION

The present invention relates to an apparatus for separating fluids into two portions having an increased and a decreased content respectively of a certain component as compared with the starting fluid, wherein the fluid under pressure is conducted along semipermeable membranes arranged on pervious supports and wherein said membranes are arranged in pairs and the membranes of each pair are spaced by means of a distance ring, and a guide plate is arranged between each pair of membranes.

Osmosis is closely related to the existence of a membrane which is selective in such a way that certain components of a solution, normally the solvent, may pass the membrane whereas one or more of the other components of the solution is unable to do so. Such a membrane is called a semipermeable membrane, normally only indicated by the word "membrane." If a membrane separates a solution from the solvent or two solutions having different concentrations a tendency will exist in order to reduce the differences in concentrations and this tendency will result in a flow of solvent from the weak solution and into the more concentrated solution. Such a flow is called osmosis.

If the pressure of a concentrated solution is increased it will be observed that the flow is reduced. By increasing the pressure successively a pressure will be reached at which the flow stops. This pressure, the pressure of equilibrium, is called "the osmotic pressure." If the pressure is increased above the osmotic pressure, the flow of solvent will reverse. This phenomenon is called "reversed osmosis." The apparatus here in question is used for reversed osmosis.

The apparatus may e.g. be used for desalination of sea water, and if so, the portion of a starting fluid which passes the membranes, viz water is used, whereas the other portion, viz sea water, having an increased concentration of salt as compared with the starting sea water is disposed of. However, sometimes it is also desired to concentrate a solution, suspension or emulsion or mixtures thereof, and if so it is the phase which does not pass the membranes which will be used. As an example fruit juices may be mentioned.

Attempts have been made to manufacture the distance rings from metal which will be able to resist the pressure which will be applied to the inner surfaces of the rings from the high fluid pressure. However, such rings are rather expensive and in order to achieve an acceptable output from the apparatus it may contain e.g. three sections each comprising 50 distance rings. Accordingly, attempts have been made to mold the distance rings from plastic material. However, it has been found that such rings are unable to resist the increased internal pressure in the apparatus. The rings are stretched so that the diameter thereof increases. In order to compensate for such stretching of the rings the whole apparatus has been enclosed in a steel enclosure which however also is very costly and results in difficulties as regards the removal of the fluid which passes the membranes and flows into the membrane supports.

SUMMARY OF THE INVENTION

The apparatus according to the present invention is characterized in that each distance ring is molded in one piece with the guide plate arranged between the pair of membranes spaced by means of said distance ring and in that a row of holes extending through said guide plate is arranged inside said ring. By means of this construction each distance ring and the corresponding guiding plate form a wheel-type structure wherein the distance ring forms the rim of the wheel and the guide plate forms the body of the wheel. It has been found that the stiffening in the radial direction offered by the wheel body is sufficient to prevent any serious change in the diameter of the ring when it is exposed to the great internal pressure from the fluid to be treated, in spite of the weakening due to the provision of the holes through the guide plate inside the rim or distance ring. The holes are necessary in order to allow the fluid to pass from the membrane at one side of the guide plate in question and to the membrane at the opposite side of that guide plate.

In order to clamp a pile together it is known to arrange an end plate at each end of the pile wherein the end plates have such dimensions as to project beyond the circumference of the pile and wherein holes are provided in the projecting margins so that the pile may be clamped together by means of a plurality of tensile bolts extending along the outer surface of the pile. Up to now this construction has been regarded as necessary for the clamping together of apparatus of the kind in question. However, it has been found that if according to an embodiment of the present invention each ring at opposite sides thereof comprises circumferentially extending ridges, such distance rings may be pressed into sealing engagement with the membranes by means of end flanges pressed towards each other by means of a single bolt extending centrally through the guide plates and the membranes whereby a simple construction is achieved.

It should be understood that the fluid under treatment will flow alternatively outwards and inwards along each guide plate and during each such radial flow the fluid will sweep the membranes facing the guide plate and the flow of fluid will be reversed by passing the holes in the guide plate. According to a further embodiment of the present invention, the thickness of the guide plates may increase from a central opening in the guide plate for the passage of the bolt and outwards towards the distance ring. If the guide plate had the same thickness all over, the fluid would, due to the radial direction of the flow, pass flow sections having alternatively increasing and decreasing areas. However, by varying the thickness of the guide plate as stated above, a compensation, at least partially, is achieved so that the flow velocity may be kept substantially constant over the membranes. The flow conditions may be further improved if each guide plate according to a still further embodiment of the invention between the distance ring and the central opening has a wave-formed cross section.

In order to avoid leakage of the fluid through the central opening of the guide plate where the bolt passes, the edge of the central opening according to an embodiment of the invention may be sharp at the side facing the main flow direction. By means of this construction only a very narrow contact surface is achieved between the central bolt and the edge along the opening, which, with a tight fit of the bolt in the central opening, results in a high specific contact pressure so that the desired sealing effect is achieved.

According to a still further embodiment of the invention the marginal area along the edge of the central opening in each guide plate may be of reduced thickness as compared with the remaining part of the guide plate and a row of radially extending bosses may be arranged along said area in order to support guide rings for the membranes and the pervious supports thereof, the guide rings having a V-section form and an inner diameter greater than the diameter of the central bolt.

By means of this construction it is possible for the fluid to flow from one membrane to the next membrane, viz inwardly between the bosses on one guide plate, through the gaps between the inner surfaces of the guide rings and the outer surface of the bolt and outwardly between the bosses on the following guide plate. At the same time the bosses act to press the guide rings into engagement with the membranes and the membranes into engagement with the membrane supports so that no part of the fluid can bypass the membranes.

According to a still further embodiment of the invention the membrane supports may at the central opening be provided with a solid ring, the radial width of which is greater than the radially extending flange of the guide rings. Thereby security against fluid leakage of the kind explained above is further increased because the fluid will press parts of the membranes projecting beyond said flanges against the annular part of the solid rings of the membrane supports projecting beyond said flanges in such a way that the membranes are pressed against

DESCRIPTION OF THE PREFERRED EMBODIMENT

Figure 1A:
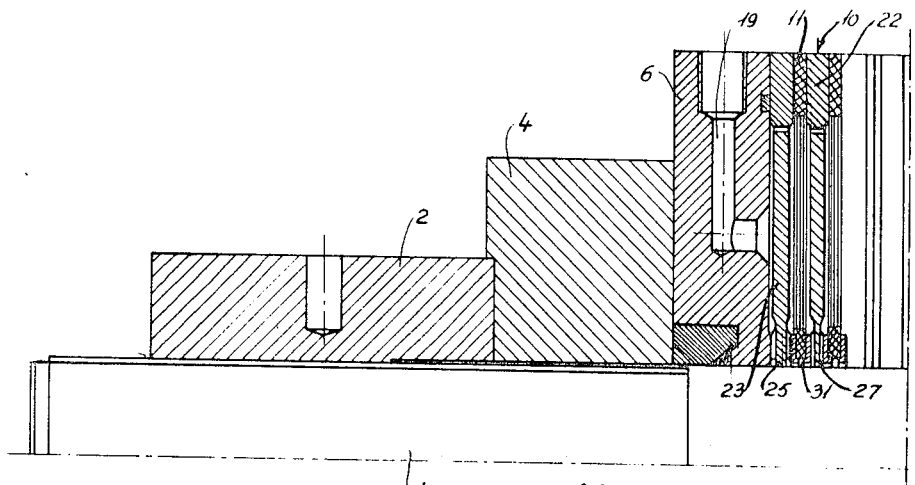
FIGS. 1A, 1B and 1C illustrate an axial section through one half of the apparatus, however only the parts necessary for the understanding of the present invention are shown.
Figure 1B:
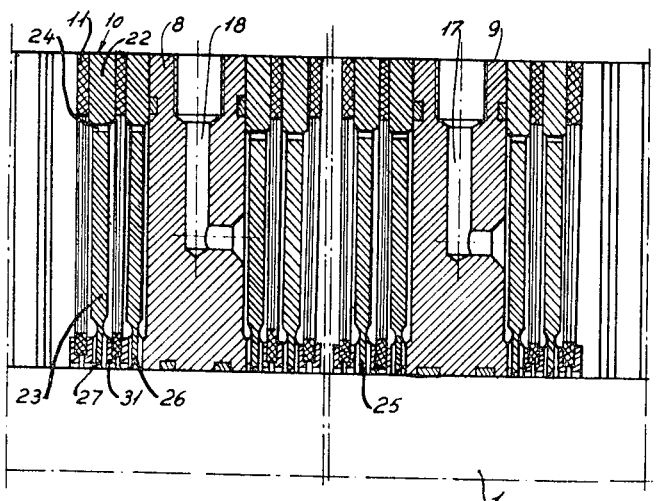
Figure 4:
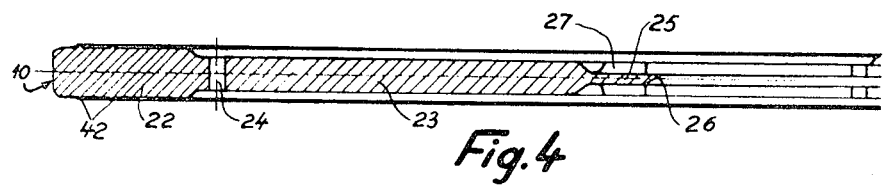
FIG. 4 is a section along the line IV—IV in FIG. 3, FIG. 5 and FIG. 6 represent parts of the section shown in FIG. 4 on a greater scale.
Figure 1C:
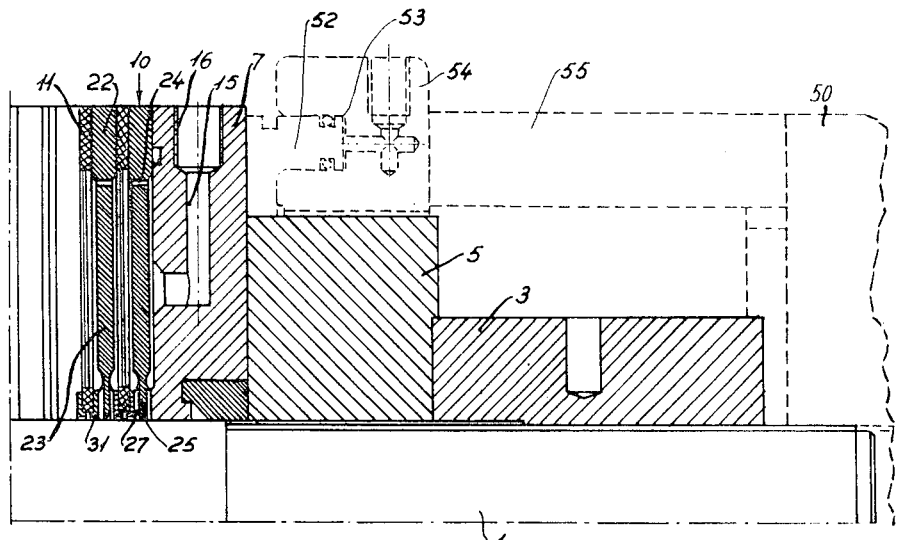

In FIGS. 1A, 1B and 1C, 1 is a bolt to which tensile forces are applied by means of nuts 2 and 3 screwed onto each end of the bolts. Inside each nut 2, 3 and end flange 4 and 5 respectively follows. Each end flange clamps against an intermediate flange 6 and 7, respectively. Two further intermediate flanges 8 and 9 are arranged on the bolt and between each two intermediate flanges a section of the apparatus is provided. Each of the sections comprises a pile of 50 wheel-type discs 10, between which membrane supports 11, also of disc form, are arranged. As it clearly appears from FIG. 2, a disc-formed sheet of filter paper 12 is provided at each side of each membrane support 11 and on each sheet of filter paper 12 a semipermeable membrane 13 is arranged. The membranes 13 are also formed as a disc.

Of each section of the apparatus only four discs 10 are fully shown in FIGS. 1A, B and C, and it will be understood that the remaining discs are arranged between the discs illustrated.

In the intermediate flange 7 an inlet conduit 15 is provided having internal threads 16 for connecting a pressure line for supplying fluid to be treated to the corresponding section of the apparatus. In the intermediate flange 7 a corresponding outlet conduit 17 is provided for connection to an outlet line for concentrated fluid. Furthermore, an inlet conduit (lying in another plane than the drawing plane and corresponding to the inlet conduit 15) is provided in the intermediate flange 9 for feeding the central section of the apparatus with fluid under pressure. The intermediate flange 8 has an outlet conduit 18, corresponding to the conduit 17 in the intermediate flange 9, and an inlet conduit (not shown) corresponding to the conduit 15 in the intermediate flange 7. The last-mentioned inlet conduit (not shown) feeds the third section of the apparatus and finally an outlet conduit 19 corresponding to the outlet conduits 17 and 18 is provided in the intermediate flange 6.

From the explanation given above it will be understood that the three sections of the apparatus work in parallel.

Each of the discs 10 is molded in one piece of plastic material by injection molding and the construction of one disc appears clearly from FIGS. 3, 4, 5 and 6. Each disc comprises an outer ring 22 of the same form as a rim of a wheel. The ring is shown in greater detail in FIG. 5. Inside the ring 22 is guide plate 23 having the form of a wheel body, along the outer edge of which a plurality of holes 24 are provided in a circle. At the center the guide plate 23 has an opening limited by a thin lip 25, FIG. 4, having a sharp edge 26 for contact against the central bolt 1 of the apparatus. The lip supports bosses 27 arranged along a circle and forming flow channels 28 for the fluid. The tops of the bosses lie generally flush with the sides of the corresponding guide plate 23.

Figure 2:
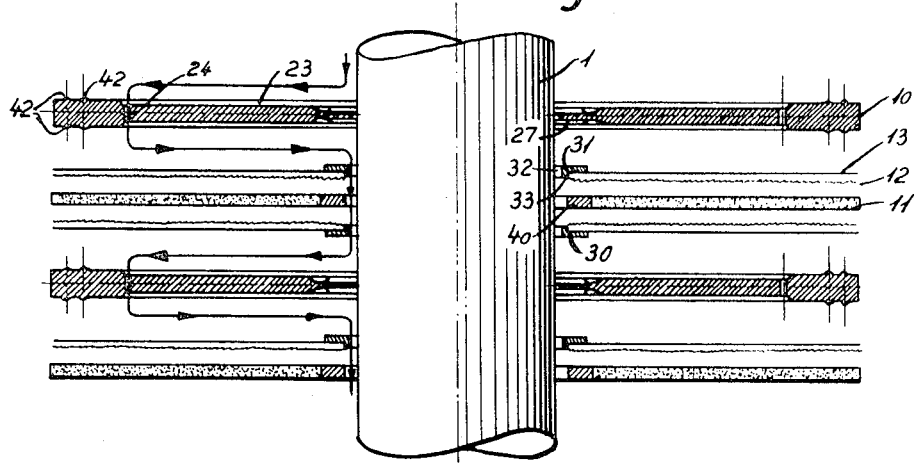
FIG. 2 shows an axial section through a part of the apparatus in which the different parts thereof for the sake of clarity are shown spaced upon a central bolt of the apparatus.

As mentioned above, a membrane support 11 is arranged between each two discs 10 and each membrane support 11 and the adjacent filter paper sheets 12 and membranes 13 are along their central openings embraced by two guide rings 30 and 31 clearly shown in FIG. 2. The guide rings have an inner diameter which is greater than the diameter of the central bolt 1. Accordingly, in the clamped position of the apparatus flow gaps 32 are formed around the bolt inside the axial flange 33 of the guide rings 30, 31. In the clamped position of the apparatus the bosses 27 on the discs 10 abut the radial flanges of the guide rings so that the guide rings clamp the inner edges of the membranes and of the filter paper sheets against the inner edges of the membrane supports 11.

Figure 7:
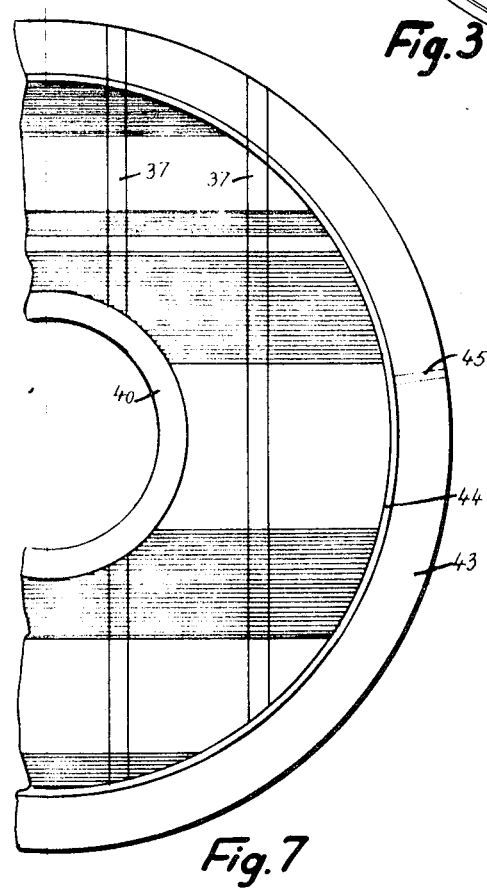
FIG. 7 illustrates one half of a membrane-supporting plate for the apparatus shown in FIGS. 1A, B and C.
Figure 8:
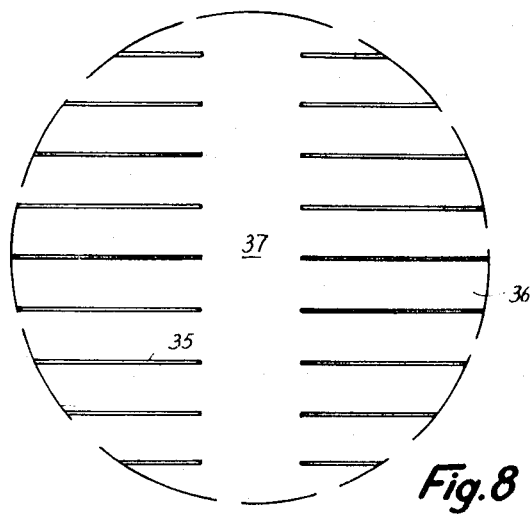
FIG. 8 is a plan view of a part of the supporting plate illustrated in FIG. 7 on a greater scale.
Figure 9:
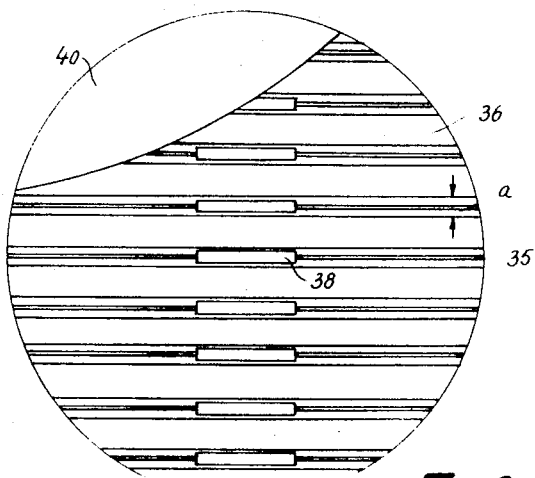
FIG. 9 illustrates another part of the plates in FIG. 7, seen from the opposite side compared with that shown in FIG. 8.

One half of a plate for a membrane support is shown in FIG. 7. The plate is molded from plastic material and comprises at one side thereof, cf. FIG. 8, very narrow slots 35 which in section have a V-shape so that the slots are several times wider at the other side of the plate, cf. the measure $a$, FIG. 9. The lamellae formed between the slots 35 indicated by 36 in FIGS. 8 and 9 are mutually connected by means of stiffening ribs 37, FIG. 7, the top surfaces of which lie flush with the side of the plate illustrated in FIG. 8 and the thickness of which is less than the thickness of the plate so that the lower surfaces of the ribs extend depressed compared to the surface of the plate illustrated in FIG. 9 as indicated at 38. Two plates of the kind illustrated in FIGS. 7–9 form a membrane support 11 by being arranged in such a way upon each other that the wide ends of the slots 35 face each other and the slots of the two plates extend almost perpendicularly to each other. Accordingly, the narrow ends of the slots 35 will face outwardly and accordingly the corresponding sides of the combined plate form a support for the two corresponding filter paper sheets and membranes. Accordingly, each membrane is securely supported by means of the wide lamellae 36 and bridges the narrow slots 35 only.

Each membrane-supporting plate comprises along the central opening for the bolt 1 a solid ring and when two plates are put together in order to form a membrane support as explained above the rings will be positioned coaxially and abut each other. In FIGS. 1A, B and C and in FIG. 2 each membrane support is shown as a single part for the sake of clarity, but it will be understood that each membrane support comprises two plates as explained above. Accordingly, the two solid rings of each membrane support are illustrated in FIG. 2 by means of a hatched rectangle 40. The inner diameter of these solid rings corresponds generally to the outer diameter of the axial flanges 33 of the guide rings 30, 31 so that the guide rings by clamping together the apparatus embrace the solid rings. Moreover, the radial flanges of the guide rings 30, 31 press the inner marginal areas of the membranes 13 and the filter paper sheets 12 against the solid rings of the membrane supports. From FIG. 2 it will be seen that the solid rings of the membrane supports are a little wider than the width of the radial flanges of the guide rings 30, 31. Accordingly, a circumferentially extending annular portion of each ring will after the clamping of the apparatus, project radially from the radial flanges of the guide rings, and accordingly the fluid pressure acting upon the outer surfaces of the membranes will press the membranes against the radially projecting part of the rings. Accordingly, the annular portion of the membranes positioned at the projecting part of the solid rings of the membrane supports will act as a seal against fluid leakage.

Figure 5:
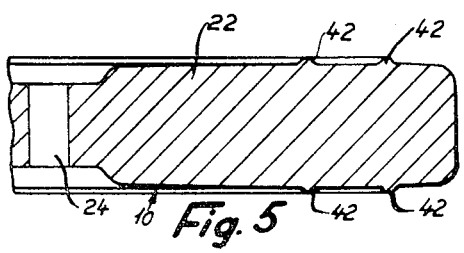

As indicated in FIG. 2, two circular ridges 42 are provided on both sides of the ring portion 22 of each disc 10, cf. FIG. 5. The ridges 42 act as sealing means. By the clamping together of the apparatus the outer margins of the membranes are pressed against the outer parts of the membrane supports 11 which are formed of solid rings 43, cf. FIG 7, in the same manner as the inner portions of the membrane supports. Due to the great specific pressure which results from the ridges 42 a sufficient sealing against leakage is achieved.

As previously mentioned the three apparatus sections are kept together in the axial direction in order to achieve the necessary sealing along the outer and inner edges of the membranes by means of the sealing ridges 42 and the guide rings along the solid portions of the membrane supports. The axial pressure necessary for achieving this sealing effect is achieved by means of the two nuts 2 and 3. Initially the apparatus is clamped together by means of an arrangement known per se and indicated in broken lines in FIG. 1C. After the end flange 4 and the corresponding nut 2 have been arranged as shown in FIG. 1A a yoke 50 is screwed onto the other end of the bolt, cf. FIG. 1C. On the part of the intermediate flange 7 projecting radially beyond the end flange 5 an annular piston 52 is now arranged, which engages an annular cylinder 53 in an annular hydraulic jack 54 and a pressure ring 55 is provided between the jack and the yoke 50. By feeding hydraulic liquid to the annular cylinder 53 the bolt 1 will be stretched and the nut 3 and accordingly also the end flange 50 can be tightened into abutment against the intermediate flange 7. After removal of the hydraulic arrangement the bolt 1 will almost maintain its tension.

It will be understood that each of the three sections of the apparatus acts in a similar manner. Accordingly, the mode of operation of the apparatus will be explained in the following with reference to one section only.

Liquid to be treated is supplied to the apparatus through one of the inlet conduits, e.g. the conduit 15, and flows therefrom into an annular space formed between the inner surface of the intermediate flange 7 and a side of the first disc 10. This space is formed due to the fact that the outer ring of the disc 10 acts as a distance ring and accordingly has a thickness greater than the thickness of the guide plate portion 23 of the disc. The liquid is distributed in the space and flows through the openings 24 to the other side of the guide plate in question. Now the liquid flows inwardly along the outer surface of the adjacent membrane, radially through the channels 28 formed between the bosses 27, through the gaps 32 between the inner surfaces of the two guide rings 30, 31 and the bolt 1 and then again radially outwardly between the bosses 37 of the following disc and radially out along the next membrane. The path which the liquid will follow is shown in FIG. 1 by means of a line with arrows.

Due to the fact that the fluid is under a high pressure and the interior of the membrane supports is in connection with the surroundings, a pressure difference will prevail between the two sides of each membrane which pressure difference is the pressure necessary for the reverse osmosis desired. The liquid passing the membranes is collected in an annular peripheral channel 44 in the membrane support, FIG. 7, and is conducted from this channel to the surroundings through a radial bore 45, FIG. 7, extending through the ring 43 of the composite membrane support.

Figure 6:
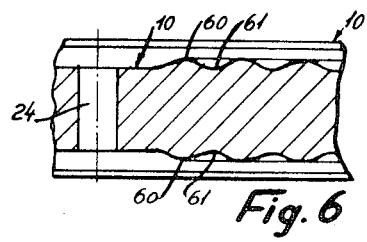
Figure 3:
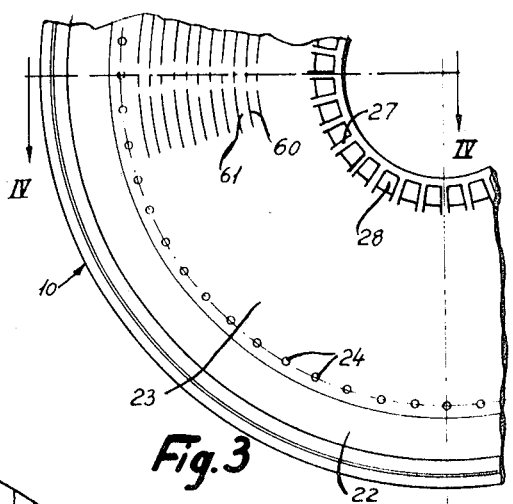
FIG. 3 illustrates a part of a combined guide plate and distance ring for the apparatus illustrated in FIGS. 1A, B and C.

It will be understood that when the fluid flows from within and outwardly it will pass flow section areas diverging in the radial direction. By forming the guide plate 23 of the disc 10 with increasing thickness from the center towards the outside a narrowing of the flow section area in the axial direction will be achieved which at least to a certain degree will compensate for the divergence in the radial direction. If the guide plates are formed in this way the fluid will after having passed the holes 24 enter a flow section having a small extension in the axial direction and a great extension in the radial direction and from the outside towards the center the flow will pass section areas of decreasing extension in the radial direction and increasing extension in the axial direction. Accordingly, it is possible to achieve a uniform and high velocity of the flow along the membranes so that an advantageous whirling motion is achieved. In order to support this whirling motion still further the guide plates 23 of the discs may have concentrical wave tops and wave valleys 60 and 61, respectively, on opposite sides as shown in FIG. 6.

We claim:

1. An apparatus for separating fluids into two portions by reverse osmosis; comprising a pile of alternating membrane supports and discs, each of said supports supporting a semipermeable membrane on each side of the support; slot means in each of said supports for providing communication between the interior of the supports and the outer surface of the apparatus; each disc comprising an outer ring portion arranged between the radially outer margins of the membranes supported by the two adjacent supports and a guide plate portion extending radially inwardly between the two adjacent membranes; a bolt extending through central holes in said membrane supports, the guide plate portions of said discs, the membranes and an end flange at each end of said pile; fastening means for clamping said outer margins of the membranes into sealing contact with said outer ring portions of the discs and for providing axial tension to said bolt; the radially inner margins of said membranes are spaced from said bolt to form flow gaps; means for sealing said flow gaps from the interior of each said membrane support; said guide plate portions having apertures adjacent said bolt and sealing means for preventing flow of fluid between the bolt and the edges of said apertures; additional holes extending through said guide plate portions inside said outer ring portions along the full extent of the inner periphery thereof; the entire opposite surfaces of each said guide plate portions being spaced from the membranes adjacent thereto both radially and circumferentially of said guide plate portion surfaces.

2. An apparatus according to claim 1, wherein each of said ring portions includes on opposite sides thereof sealing means in the form of circumferentially extending ridges.

3. An apparatus according to claim 1, wherein the thickness of said guide plate portions increases from said central holes outwardly towards said outer ring portions of each disc.

4. An apparatus according to claim 1, wherein each guide plate portion has a wave-formed cross section between the central hole in said guide plate portion and said outer ring portion.

5. An apparatus according to claim 1, wherein said sealing means for preventing flow of fluid between the bolt and the edges of said apertures in said guide plate portions are formed by sharp lips along the edges of said apertures facing the main flow direction of said fluid, said lips contacting the bolt around the entire circumference thereof, the sharp edges of said lips are formed at the side of the guide plate portions facing the main flow direction of said fluid.

6. An apparatus according to claim 1, wherein the marginal area along the edge of the central hole in each guide plate portion is of reduced thickness as compared with the remaining part of the guide plate portion and includes radially extending bosses, and further comprising guide rings for the radially inner margins of said membranes and said membrane supports and having a V-shape is positioned upon said bosses, the inner diameter of said guide rings being greater than the diameter of the bolt for providing said flow gaps.

7. An apparatus according to claim 1, wherein a marginal area along the edge of the central hole in each guide plate portion is of reduced thickness as compared with the remaining part of the guide plate portion, a row of bosses extend radially along said area, a guide ring having a V-shape, is supported upon each said row of bosses by means of a radially extending flange of said guide ring, the other flange of said guide ring being axially directed and surrounding said bolt and being spaced from the bolt, the radially inner marginal portions of each membrane support being solid and having a radial width which is greater than the width of the radially extending flanges of said guide rings, said solid inner marginal portion of each membrane support being clamped axially between the radially extending flanges of the two adjacent guide rings, the radially inner margins of the membranes of said membrane support being clamped between the radially extending flanges of the adjacent guide rings and the solid marginal portion of said membrane support.

* * * * *